United States Patent
Agarwal et al.

(10) Patent No.: US 10,412,014 B2
(45) Date of Patent: Sep. 10, 2019

(54) LATENCY ENHANCEMENT IN A WIRELESS COMMUNICATION SYSTEM

(71) Applicant: QUALCOMM Incorporated, San Diego, CA (US)

(72) Inventors: Ravi Agarwal, San Diego, CA (US); Chetan Chakravarthy, San Diego, CA (US); Sharad Sambhwani, San Diego, CA (US); Sivaram Srivenkata Palakodety, San Diego, CA (US); Juha Mikko Sirkka, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 286 days.

(21) Appl. No.: 15/218,701

(22) Filed: Jul. 25, 2016

(65) Prior Publication Data

US 2017/0142018 A1 May 18, 2017

Related U.S. Application Data

(60) Provisional application No. 62/255,940, filed on Nov. 16, 2015.

(51) Int. Cl.
*H04L 12/859* (2013.01)
*H04L 12/26* (2006.01)
(Continued)

(52) U.S. Cl.
CPC ...... *H04L 47/2475* (2013.01); *H04L 43/0882* (2013.01); *H04L 43/16* (2013.01); *H04L 69/22* (2013.01); *H04W 76/27* (2018.02)

(58) Field of Classification Search
None
See application file for complete search history.

(56) References Cited

U.S. PATENT DOCUMENTS

2013/0122888 A1* 5/2013 Willars .................. H04W 8/22
455/418
2014/0022978 A1 1/2014 Chen et al.
(Continued)

OTHER PUBLICATIONS

International Search Report and Written Opinion issued in International Patent Application No. PCT/US2016/059593, dated Jan. 2, 2017 (13 pages).

*Primary Examiner* — Mohammad S Adhami
(74) *Attorney, Agent, or Firm* — Arent Fox LLP (57) ABSTRACT

The disclosure provides for a user equipment (UE) detecting an indication of an application-specific latency reduction triggering condition that may trigger switching of a communication state of the UE. For example, the UE may be in an initial state. The UE may transition into a different state that is associated with lower latency for data transfer. In an aspect, the UE may trigger the indication for latency reduction even when the network-configured criteria for the indication has not yet been met. The UE may trigger an application-specific latency reduction triggering condition during the startup of an application, which triggers a resource request message even before the network-configured threshold value for generating such resource request messages is satisfied. The resource request message may cause the network to command the UE to transition to a state that has a latency less than that in the current state.

30 Claims, 5 Drawing Sheets

(51) Int. Cl.
*H04L 29/06* (2006.01)
*H04W 76/27* (2018.01)

(56) References Cited

U.S. PATENT DOCUMENTS

| | | | |
|---|---|---|---|
| 2014/0051454 A1* | 2/2014 | Wirtanen | H04W 76/046 455/452.1 |
| 2015/0181606 A1 | 6/2015 | Gribe et al. | |
| 2016/0057804 A1* | 2/2016 | Karlsen | H04W 52/0216 455/422.1 |

* cited by examiner

LATENCY ENHANCEMENT IN A WIRELESS COMMUNICATION SYSTEM

CLAIM OF PRIORITY

The present Application for Patent claims priority to U.S. Provisional Application No. 62/255,940 entitled "LATENCY ENHANCEMENT IN A WIRELESS NETWORK" filed Nov. 16, 2015, which is assigned to the assignee hereof and hereby expressly incorporated by reference in its entirety herein.

BACKGROUND

Aspects of the present disclosure relate generally to wireless communication systems, and more particularly, to management of latency of transmissions in a wireless communication system.

Wireless communication networks are widely deployed to provide various communication services such as telephony, video, data, messaging, broadcasts, and so on. Such networks, which are usually multiple access networks, support communications for multiple users by sharing the available network resources. One example of such a network is the UMTS Terrestrial Radio Access Network (UTRAN). The UTRAN is the radio access network (RAN) defined as a part of the Universal Mobile Telecommunications System (UMTS), a third generation (3G) mobile phone technology supported by the 3rd Generation Partnership Project (3GPP). The UMTS, which is the successor to Global System for Mobile Communications (GSM) technologies, currently supports various air interface standards, such as Wideband-Code Division Multiple Access (W-CDMA), Time Division-Code Division Multiple Access (TD-CDMA), and Time Division-Synchronous Code Division Multiple Access (TD-SCDMA). The UMTS also supports enhanced 3G data communications protocols, such as High Speed Packet Access (HSPA), which provides higher data transfer speeds and capacity to associated UMTS networks.

Network components may rely on information from a UE to determine and assign network resources to the UE. The amount and type of resources assigned affect the experience of the user of the UE. This can include the latency observed by the user. In some instances, a network entity may possess only partial information to assign resources to the UE. For example, it may have knowledge (through reports from the UE) of the amount of data in the buffer of the UE, but may not be aware of the service type or requirements that generated the data.

Accordingly, improvements to information exchange and latency of communications may be desirable.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its purpose is to present some concepts of one or more aspects in a simplified form as a prelude to the more detailed description that is presented later.

In accordance with an aspect, a method of latency reduction in wireless communications includes operating a user equipment (UE) in a first communication state having a first communication latency. The method further includes detecting, by a modem processor of the UE, an indication of an application-specific latency reduction triggering condition representing an application-specific activity. Additionally, the method includes generating, by the modem processor of the UE, a resource request message in response to detecting the indication of the application-specific latency reduction triggering condition and irrespective of a UE criteria value satisfying a network-configured threshold value for the generating of the resource request message. The method also includes transmitting, by a transceiver of the UE, the resource request message to a network entity requesting transition of the modem processor to a second communication state having a second communication latency less than the first communication latency.

In accordance with an aspect, an apparatus for latency reduction in wireless communications includes an application processor configured to operate the UE in a first communication state having a first communication latency. The apparatus further includes a modem processor coupled to the application processor and configured to detect an indication of an application-specific latency reduction triggering condition representing an application-specific activity and generate a resource request message in response to detecting the indication of the application-specific latency reduction triggering condition and irrespective of a UE criteria value satisfying a network-configured threshold value for the generating of the resource request message. Additionally, the apparatus includes a transceiver coupled to the modem processor and configured to transmit the resource request message to a network entity requesting transition of the modem processor to a second communication state having a second communication latency less than the first communication latency.

In accordance with an aspect, a computer-readable medium storing computer executable code for latency reduction includes code for operating a user equipment (UE) in a first communication state having a first communication latency. The computer-readable medium further includes code for detecting, by a modem processor of the UE, an indication of an application-specific latency reduction triggering condition representing an application-specific activity. Additionally, the computer-readable medium includes code for generating, by the modem processor of the UE, a resource request message in response to detecting the indication of the application-specific latency reduction triggering condition and irrespective of a UE criteria value satisfying a network-configured threshold value for the generating of the resource request message. The computer-readable medium further includes code for transmitting, by a transceiver of the UE, the resource request message to a network entity requesting transition of the modem processor to a second communication state having a second communication latency less than the first communication latency.

In accordance with an aspect, an apparatus for latency reduction in wireless communications includes means for operating a user equipment (UE) in a first communication state having a first communication latency. The apparatus further includes means for detecting, by a modem processor of the UE, an indication of an application-specific latency reduction triggering condition representing an application-specific activity. Additionally, the apparatus includes means for generating, by the modem processor of the UE, a resource request message in response to detecting the indication of the application-specific latency reduction triggering condition and irrespective of a UE criteria value satisfying a network-configured threshold value for the generating of the resource request message. The apparatus also include means for means for transmitting, by a transceiver of the UE, the resource request message to a network entity requesting transition of the modem processor to a second communication state having a second communication latency less than the first communication latency.

These and other aspects of the present disclosure will become more fully understood upon a review of the detailed description, which follows.

DETAILED DESCRIPTION

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known components are shown in block diagram form in order to avoid obscuring such concepts.

The present aspects relate to reducing latency during wireless communication. For example, some networks may rely on information received from a user equipment (UE) to determine and assign resources to the UE. Such resources may include, but not be limited to power allocation, coding scheme/format, bandwidth, and/or radio resource control (RRC) state. The amount of type of resources assigned to the UE may in turn affect the user experience, for example, a latency observed by the user (and correspondingly experienced by the UE). In some aspects, latency may be an amount of time (e.g., time interval) it takes for a packet of data to get from one designated point (e.g., UE) to another (e.g., network entity). For instance, in the context of data communication at the UE, latency may be the time from a UE transmitting a portion of data, requesting a download or a webpage to load, to the time when the UE receives a response.

In some instances, the network may possess partial information used for assigning resources to the UE. For instance, the network may possess information (e.g., via reports received from the UE), of an amount of data in the UE's buffer, but may not be aware of a service type or requirements that generated the data. However, such information may reside at the UE. Without knowledge of such information, the network may be unable to trigger the UE to change a communication state to reduce latency. As such, it would be beneficial for the UE to proactively transmit a request in the form of a message to the network for adjusting a communication state of the UE to reduce latency.

Specifically, based on the information at the UE, the UE may trigger and transmit an message to the network in order to acquire resources from the network for communication, even if network-configured criteria that typically triggers the transmission of the message have not been met. For example, in WCDMA/HSPA, during operation in a CELL_FACH state, a traffic volume measurement report Event 4A may be triggered and transmitted by the UE to the network when the amount of data in the UE's buffer exceeds the network-configured threshold (e.g., total buffer occupancy (BO) of RLC buffer indicative of transport channel traffic volume exceeds the network-configured threshold). Upon reception of the traffic volume measurement report Event 4A, the network may transmit a state transition message to cause the UE to transmission to the CELL_DCH state, which may reduce latency for data transfer or communication compared to the CELL_FACH state. That is, operating according to the CELL_DCH state may result in lower latency of data communication than operating according to the CELL_FACH state.

Additionally, similar to the CELL_FACH state, during operation in a URA_PCH state, the UE may initiate a CELL UPDATE procedure in response to a mobile-originated (MO) or mobile-terminated (MT) call. The traffic volume indicator information element (IE) in the CELL_UPDATE message indicates to the network whether the amount of data in the UE's buffer has exceeded the network-configured threshold. If the IE is set to TRUE (or "1"), the network may permit the UE to change to the CELL_DCH state by transmitting a state transition message indicating such to the UE.

In some aspects, CELL_FACH may be characterized by a lack of a dedicated physical channel allocated to the UE. Further, the UE may continuously monitor a FACH in the downlink. The UE may also be assigned a default common or shared transport channel in the uplink (e.g. RACH) that it may use anytime according to the access procedure for that transport channel. Additionally, in some aspects, URA_PCH may be characterized by not having a dedicated channel allocated to the UE. Further, the UE may select a PCH with the algorithm, and uses DRX for monitoring the selected PCH via an associated PICH. Also, no uplink activity may be possible. Moreover, in some aspects, CELL_DCH may be characterized by having a dedicated physical channel allocated to the UE in uplink and downlink. Further, the UE may be known on cell level according to its current active set. Additionally, dedicated transport channels, downlink and uplink (TDD) shared transport channels, and a combination of these transport channels may be used by the UE.

As such, to improve latency during an RRC connected mode at the UE, the disclosure provides for the UE to trigger and/or transmit a resource request message based on an indication of an application-specific latency reduction triggering condition at the UE irrespective of whether the network-configured criteria is met, where the resource request message may initiate a switch to a lower latency state for the UE. In an aspect, for example, the UE may be in an initial state, (e.g., CELL_FACH or URA_PCH), and as a result of a network entity acting on the resource request message, the UE may transition into a different state (e.g., CELL_DCH) that is associated with lower latency for data transfer. In an aspect, the UE may trigger the resource request message (e.g., Event 4A or Cell Update) for latency reduction even when the network-configured criteria for the resource request message have not yet been met. For example, in an aspect, the UE may detect an application-specific latency reduction triggering condition during the startup of a predetermined application or application process, which triggers a resource request message (e.g., Event 4A or Cell Update) even before achieving a network-configured threshold value for generating such resource request messages.

That is, for instance, in the CELL_FACH state, the UE may be triggered to transmit the Event 4A message independent or irrespective of whether the network-configured criteria has been met (e.g., UE buffer exceeds the network-configured threshold). Additionally, for instance, in the URA_PCH state, the UE may initiate a CELL_UPDATE procedure and set the traffic volume indicator IE to TRUE in the CELL_UPDATE message, similarly independent or irrespective of whether the network-configured criteria for setting the IE to TRUE has been met (e.g., UE buffer exceeds the network-configured threshold). In both instances, latency may be reduced by transitioning to a more efficient communication state (e.g., CELL_DCH). Specifically, the resource request message (e.g., Event 4A or Cell Update) may cause a network entity, e.g., a serving base station, to trigger the UE to transition to a state that has a latency less than that in its current state.

Figure 1:
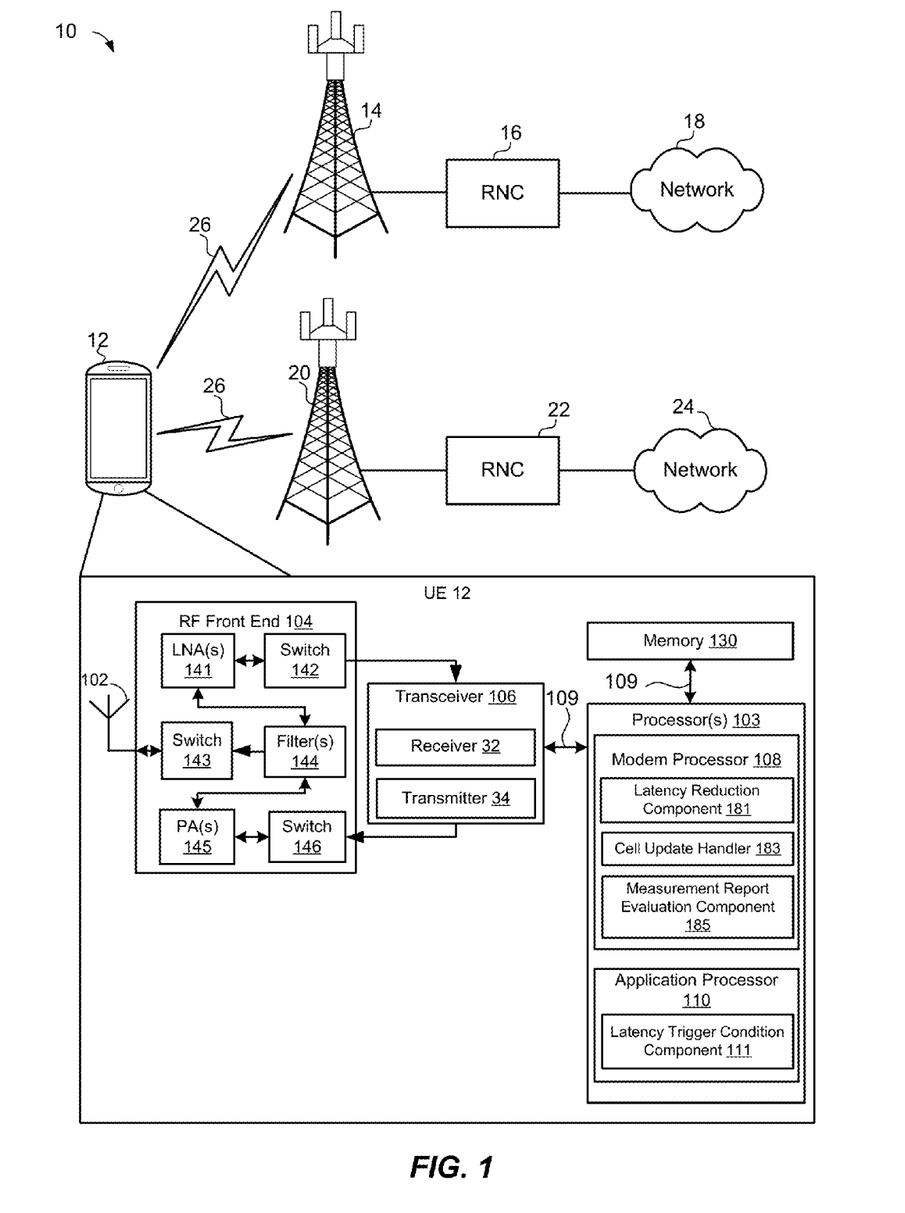
FIG. 1 is a block diagram illustrating an example communications network including a base station in communication with a user equipment configured to perform latency reduction according to one or more of the presently described aspects.

Referring to FIG. 1, in an aspect, a wireless communication system 10 includes at least one UE 12 in communication coverage of at least one network entity 14 (e.g., base station or node B, or a cell thereof, in an HSPA network). UE 12 may communicate with a network 18 via the network entity 14 and a radio network controller (RNC) 16. In some aspects, multiple UEs including UE 12 may be in communication coverage with one or more network entities, including network entity 14 and network entity 20. In an aspect, the network entity 14 or network entity 20 may be a base station such as eNodeB in a long term evolution (LTE) network 24 including an evolved packet core (EPC) (not shown). Although various aspects are described in relation to a UMTS HSPA network, similar principles may be applied in an LTE network, Evolution-Data Optimized (EV-DO) network, or other wireless wide area networks (WWAN). The wireless network may employ a scheme where multiple base stations may transmit on a channel. In an example, UE 12 may transmit and/or receive wireless communications to and/or from network entity 14 and/or network entity 20. In an aspect, the UE 12 may operate in a connected mode (e.g., CELL_DCH state), where, for example, the UE 12 may be actively communicating with network entity 14.

In some aspects, UE 12 may also be referred to by those skilled in the art (as well as interchangeably herein) as a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a terminal, a user agent, a mobile client, a client, or some other suitable terminology. A UE 12 may be a cellular phone, a personal digital assistant (PDA), a wireless modem, a wireless communication device, a handheld device, a tablet computer, a laptop computer, a cordless phone, a wireless local loop (WLL) station, a global positioning system (GPS) device, a multimedia device, a video device, a digital audio player (e.g., MP3 player), a camera, a game console, a wearable computing device (e.g., a smart-watch, smart-glasses, a health or fitness tracker, etc.), an appliance, a sensor, a vehicle communication system, a medical device, a vending machine, a device for the Internet-of-Things, or any other similar functioning device. Additionally, network entity 14 may be a macrocell, picocell, femtocell, relay, Node B, mobile Node B, UE (e.g., communicating in peer-to-peer or ad-hoc mode with UE 12), or substantially any type of component that can communicate with UE 12 to provide wireless network access at the UE 12.

According to the present aspects, the UE 12 may include one or more processors 103, including a modem processor 108 and an application processor 110. One or more of processors 103 and memory 130 may operate in combination with components in one of the processors, for example, latency trigger condition component 111 that may be located in application processor 110 and latency reduction component 181 in modem processor 108, to initiate a change of state at UE 12 to reduce latency in communications between UE 12 and a serving network entity, such as network entity 14.

For example, in an aspect, latency trigger condition component 111 may be configured to detect an application-specific latency reduction triggering condition representing or corresponding to an application-specific activity and sends an indication to latency reduction component 181 of modem processor 108. In some aspects, the application-specific activity may be, for example, a web-browsing activity, a messaging activity, and/or a media player activity. As such, the application-specific latency reduction triggering condition may be a startup or execution of an application program at the UE 12 that results in data communication. In an aspect, the term "component" as used herein may be one of the parts that make up a system, may be hardware, firmware, and/or software, and may be divided into other components. Also, although described herein as being a part of application processor 110, it should be understood that latency trigger condition component 111 may be a component of modem processor 108, or of any other one of the one or more processors 103.

In response to receiving the indication of the application-specific latency reduction triggering condition, one or more of processor 103 and memory 130 may operate with one or more components in modem processor 108, including latency reduction component 181, and optionally cell update handler 183 and/or measurement report evaluation component 185, to generate and transmit to a network entity one or more resource request messages for requesting a change in connected mode state. Further, in some aspects, the UE 12 may trigger, via modem processor 108, the resource request message for latency reduction even when the network-configured criteria (e.g., UE criteria value satisfying a network-configured threshold value) for the resource request message have not yet been met. That is, UE 12 may, via modem processor 108, be configured to generate and transmit the resource request message requesting a change in connected mode state (e.g., to a lower latency state such as CELL_DCH) irrespective of a UE criteria value satisfying a network-configured threshold value.

For example, the resource request message may include, but is not limited to, an Event 4A message (e.g., in CELL_FACH state), which may be generated and transmitted independent or irrespective of whether the network-configured criteria has been met. Also, for example, the resource request message may include, but is not limited to, a CELL_UPDATE message (e.g., in URA_PCH state) having a "traffic volume indicator" information element (IE) set to a value of TRUE independent of whether the network-configured criteria for setting the IE to TRUE has been met. In an aspect, one or more processors 103 may also transition UE 12 to operate in a different state (e.g., transitioning from URA_PCH to CELL_FACH to CELL_DCH, or transitioning from CELL_FACH to CELL_DCH) in response to receiving a state transition message from network entity 14 based on transmitting the resource request message. As such, the present aspects may identify an application-specific latency reduction trigger condition, and induce a state change at UE 12 to reduce a latency in communications between UE 12 and network entity 14.

Processor 103 may be coupled to the transceiver 106 and memory 130 via at least one bus 109. In an aspect, the components of modem processor 108, including latency reduction component 181, cell update handler 183, and/or measurement report evaluation component 185 may be communicatively coupled to a transceiver 106, which may include a receiver 32 for receiving and processing RF signals and a transmitter 34 for processing and transmitting RF signals.

Receiver 32 may include hardware, firmware, and/or software code executable by a processor for receiving data, the code comprising instructions and being stored in a memory (e.g., computer-readable medium). Receiver 32 may be, for example, a radio frequency (RF) receiver. In an aspect, receiver 32 may receive signals transmitted by the network entity 14. Receiver 32 may obtain measurements of the signals. For example, receiver 32 may determine Ec/Io, SNR, etc.

Transmitter 34 may include hardware, firmware, and/or software code executable by a processor for transmitting data, the code comprising instructions and being stored in a memory (e.g., computer-readable medium). Transmitter 34 may be, for example, a RF transmitter.

In an aspect, the one or more processors 103 can include or be a part of transceiver 106, or vice versa. For example, in an aspect, the one or more processors 103 and/or transceiver 106 may include any one or any combination of modem processor 108, application processor 110, a baseband processor, a digital signal processor, a receive processor, a receiver processor associated with receiver 32, a transmit processor, or a transceiver processor associated with transceiver 106.

The latency reduction component 181 included in modem processor 108 may include hardware, firmware, and/or software code executable by a processor for triggering latency reduction procedures for UE 12. For example, the hardware may include, for example, a hardware accelerator, or specialized processor. In an aspect, this may include, for example, receiving an application-specific latency reduction indication from latency trigger condition component 111. In an aspect, latency reduction component 181 may further be operable to generate a resource request message (e.g., to transmit to network entity 14) based on the received application-specific latency reduction indication. In an aspect, latency reduction component 181 may generate the resource request message when a UE criteria value is less than a network-configured threshold value for generating the resource request message.

The cell update handler 183 may include hardware, firmware, and/or software code executable by a processor for generating cell update messages as triggered by latency reduction component 181. For example, the hardware may include, for example, a hardware accelerator, or specialized processor. In an aspect, the cell update handler 183 may be in the RRC layer of the radio protocol stack and may generate a cell update request message based on a trigger generated from latency reduction component 181. In an aspect, the cell update message may include an information element (IE). For example, a cell update request may include a traffic volume indicator that is set to TRUE, independent of whether the network-configured criteria for setting the IE to TRUE has been met and based on the indication of the application-specific latency reduction condition, to indicate the UE 12 desires to transition to a connected mode (e.g., CELL_DCH state).

The measurement report evaluation component 185 may include hardware, firmware, and/or software code executable by a processor for generating a measurement report to trigger a transition to a different communications state. For example, the hardware may include, for example, a hardware accelerator, or specialized processor. In an aspect, the latency reduction component 181 may trigger measurement report evaluation component 185 to generate a resource request in the form of a traffic volume measurement report event 4A, independent of whether the network-configured criteria has been met and based on the indication of the application-specific latency reduction condition, which may cause network entity 14 to command UE 12 to transition to a connected mode (e.g., CELL_DCH state).

The latency trigger condition component 111 may include hardware, firmware, and/or software code executable by a processor for generating the indication of the latency reduction trigger condition (also referred to as a latency reduction trigger condition indication). For example, the hardware may include, for example, a hardware accelerator, or specialized processor. In an aspect, for example, application processor 110 may use latency trigger condition component 111 to determine a condition associated with a potential for a reduction in communication latency (e.g., the latency reduction trigger condition) by transitioning to a different communication state. For example, such a latency reduction trigger condition may include, but is not limited to, identification of startup of a predetermined one or more applications, and detecting of user activity requiring high data transfer. In such instances, latency trigger condition component 111 may generate and transmit the indication of the application-specific latency reduction trigger condition to modem processor 108.

Moreover, in an aspect, UE 12 may include RF front end 104 and transceiver 106 for receiving and transmitting radio transmissions, for example, wireless communications 26 transmitted by the network entity 14 or network entity 20. For example, transceiver 106 may communicate with modem processor 108 to transmit messages generated by latency reduction component 181, and optionally cell update handler 183 and/or measurement report evaluation component 185.

RF front end 104 may be connected to one or more antennas 102 and can include one or more low-noise amplifiers (LNAs) 141, one or more switches 142, 143, one or more power amplifiers (PAs) 145, and one or more filters 144 for transmitting and receiving RF signals. In an aspect, components of RF front end 104 can connect with transceiver 106. Transceiver 106 may connect to modem processor 108 and processor 103. In some aspects, modem processor 108 may form or be part of one or more modems.

In an aspect, LNA 141 can amplify a received signal at a desired output level. In an aspect, each LNA 141 may have a specified minimum and maximum gain values. In an aspect, RF front end 104 may use one or more switches 142, 143 to select a particular LNA 141 and its specified gain value based on a desired gain value for a particular application. In an aspect, the RF front end 104 may provide measurements (e.g., Ec/Io) and/or applied gain values to the modem processor 108.

Further, for example, one or more PA(s) 145 may be used by RF front end 104 to amplify a signal for an RF output at a desired output power level. In an aspect, each PA 145 may have a specified minimum and maximum gain values. In an aspect, RF front end 104 may use one or more switches 143, 146 to select a particular PA 145 and its specified gain value based on a desired gain value for a particular application.

Also, for example, one or more filters 144 can be used by RF front end 104 to filter a received signal to obtain an input RF signal. Similarly, in an aspect, for example, a respective filter 144 can be used to filter an output from a respective PA 145 to produce an output signal for transmission. In an aspect, each filter 144 can be connected to a specific LNA 141 and/or PA 145. In an aspect, RF front end 104 can use one or more switches 142, 143, 146 to select a transmit or receive path using a specified filter 144, LNA, 141, and/or PA 145, based on a configuration as specified by transceiver 106 and/or processor 103.

Transceiver 106 may be configured to transmit and receive wireless signals through antenna 102 via RF front end 104. In an aspect, transceiver may be tuned to operate at specified frequencies such that UE 12 can communicate with, for example, network entity 14 or network entity 20. In an aspect, for example, modem processor 108 can configure transceiver 106 to operate at a specified frequency and power level based on the UE configuration of the UE 12 and communication protocol used by modem processor 108.

In an aspect, modem processor 108 can be a multiband-multimode modem, which can process digital data and communicate with transceiver 106 such that the digital data is sent and received using transceiver 106. In an aspect, modem processor 108 can be multiband and be configured to support multiple frequency bands for a specific communications protocol. In an aspect, modem processor 108 can be multimode and be configured to support multiple operating networks and communications protocols. In an aspect, modem processor 108 can control one or more components of UE 12 (e.g., RF front end 104, transceiver 106) to enable transmission and/or reception of signals from the network based on a specified modem configuration. In an aspect, the modem configuration can be based on the mode of the modem and the frequency band in use. In another aspect, the modem configuration can be based on UE configuration information associated with UE 12 as provided by the network during cell selection and/or cell reselection.

UE 12 may further include memory 130, such as for storing data used herein and/or local versions of applications or latency reduction component 181, cell update handler 183, measurement report evaluation component 185, and/or latency trigger condition component 111 being executed by processors 103. Memory 130 can include any type of computer-readable medium usable by a computer or processors 103, such as random access memory (RAM), read-only memory (ROM), tapes, magnetic discs, optical discs, volatile memory, non-volatile memory, and any combination thereof. In an aspect, for example, memory 130 may be a computer-readable storage medium that stores one or more computer-executable codes defining latency reduction component 181, cell update handler 183, measurement report evaluation component 185, and/or latency trigger condition component 111, and/or data associated therewith, when UE 12 is operating processor 103 to execute latency reduction component 181, cell update handler 183, measurement report evaluation component 185, and/or latency trigger condition component 111. In another aspect, for example, memory 130 may be a non-transitory computer-readable storage medium.

Additionally, although illustrated as separate components, all or different combinations of the one or more processors 103, transceiver 106, RF front end 104, and memory 130 may be provided as a single component, such as in a system on chip (SoC).

Figure 2:
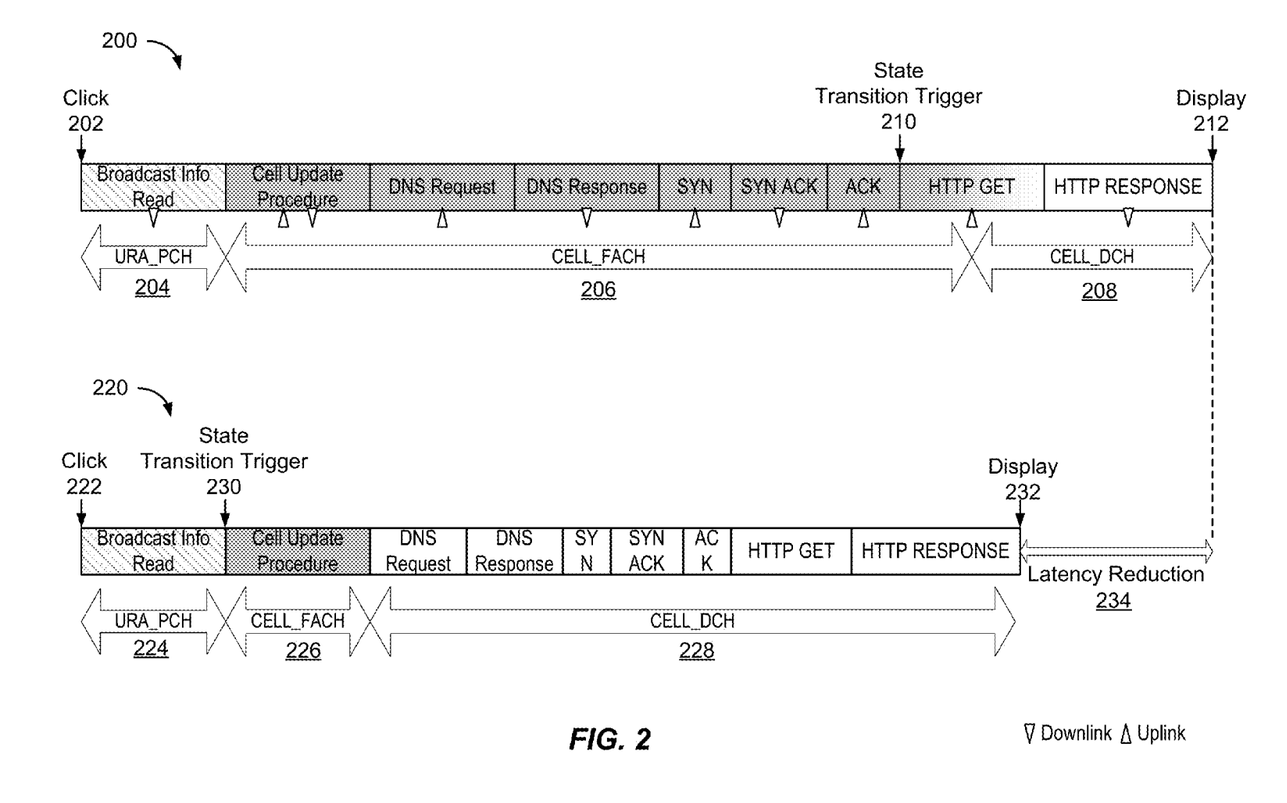
FIG. 2 is a conceptual diagram illustrating multiple data flows with reference to a URA_PCH state in accordance with one or more of the presently described aspects.

Referring to FIG. 2, a conceptual diagram of multiple data flows is illustrated with reference to a transition from a URA_PCH state 204, 224 to a CELL_DCH state 208, 228. In some aspects, data flows 200 and 220 may be in reference to latency reduction 234 for an application-specific activity related to web-browsing beginning from the URA_PCH state 204, 224. For example, data flow 200 may trigger a change or transition from the URA_PCH state 204 to the CELL_DCH state 208 as a result of high traffic volume as determined based on the network-configured criteria being met. In contrast, data flow 220, in accordance with the present aspects, may trigger early transition (e.g., compared to data flow 200) to the CELL_DCH state 208 from the URA_PCH state 204 upon detecting an application-specific activity such as, but not limited to, web-browsing activity.

For instance, with reference to data flow 200, which may be performed at UE 12 (FIG. 1), upon initiation of an application-specific activity such as a click 202, the UE 12 may read system information from the broadcast information and transitions from the URA_PCH state 204 to the CELL_FACH state 206, where UE 12 may perform a cell update procedure. In some aspects, the cell update procedure may update the network (e.g., UTRAN) with a current network entity (e.g., cell) of the UE 12 after cell selection/reselection in the CELL_FACH state 206 (or the CELL_PCH state).

Further during the CELL_FACH state 206, and as part of the cell update procedure, the network may indicate the RRC state of UE 12 to be the CELL_FACH state 206 in a cell update confirm message. Subsequently, the UE 12 may perform a domain name system (DNS) request or query and receive a DNS response from the network. Additionally, to establish the transmission control protocol (TCP) connection, the UE 12 may, during the CELL_FACH state 206, transmit a synchronization (SYN) message requesting an establishment of a TCP connection (e.g., by synchronizing the sequence numbers), receiving a SYN acknowledgement (ACK) message from the network indicating that the TCP connection has been opened, and transmitting an ACK message indicating a valid reception of the SYN ACK.

Further, UE 12 may then generate a hypertext transfer protocol (HTTP) get message to retrieve information from a given server using a given uniform resource identifier (URI). In some aspects, upon generation of the HTTP get message, UE 12 may detect state transition trigger 210, which may be indicative of an amount of data in UE's 12 buffer meeting or exceeding the network-configured threshold (e.g., Event 4A threshold), at which point the UE 12 transmits the Event 4A message. The network transitions the device (e.g., via a state transition message) to the CELL_DCH state 208 and the UE 12 may complete the HTTP Get transmission and receives an HTTP response. At this point, the UE 12 may display 212 content on the web-browser of UE 12. As such, in some aspects, the duration from click 202 to display 212 may contribute to user-perceived latency of web-browsing (e.g., time to content).

To reduce latency, UE 12 may trigger a transition to the CELL_DCH state 228 in accordance with data flow 220. For instance, upon detecting a web-browsing session based on detecting a click 222 (e.g., or another application-specific activity) when in the URA_PCH state 224, the UE 12 may, via state transition trigger 230, trigger early transition to the CELL_DCH 228 from the URA_PCH state 224. Specifically, based on state transition trigger 230, the UE 12 may set the traffic volume indicator information element (IE) to TRUE in a cell update message during the CELL_FACH state 226, even though the amount of data in the buffer of UE 12 has not yet exceeded the network-configured threshold. That is, the UE 12 may generate and transmit the cell update message with the IE set to TRUE indicating a request to transition to the CELL_DCH state 228 irrespective of whether the network-configured criteria for generating and transmitting such message have been met. Upon reception of the cell update message with the IE set to TRUE, the network indicates the UE 12 to transition to the CELL_DCH state 228 in a cell update confirm message. The UE 12 then may proceed with the DNS request and DNS response, SYN, SYN ACK, ACK, and HTTP request and HTTP response in the CELL_DCH state 228, and resulting in display 232 of the content.

As a result of the early transition to the CELL_DCH state 228, the UE 12 may experience a latency reduction 234 compared to data flow 200 (e.g., quicker click 222 to display 232). The UE 12 may benefit from latency reduction 234 due to higher uplink and downlink rates in the CELL_DCH 228 compared to the CELL_FACH state 226, which may result in a shorter data transmit/receive time. Further, RACH preamble ramping procedure may not be performed in the CELL_DCH state 228, as opposed to the CELL_FACH state 226. Additionally, data flow 220 may provide for a single reconfiguration of UE 12 connected mode state compared to two reconfigurations for data flow 200 (e.g., URA_PCH state 204 to CELL_FACH state 206 and CELL_FACH 206 to CELL_DCH 228).

In some aspects, the URA_PCH state 204, 224 may be characterized by not having uplink transmissions and paging only on the downlink. Further, the CELL_FACH state 206, 226 may be characterized by enabling RACH on the uplink and limiting data communication rates on the uplink and the downlink. Additionally, the CELL_DCH state 208, 228 may be characterized by not enabling RACH, yet enabling higher data communication rates on the uplink and the downlink compared to the other states.

Figure 3:
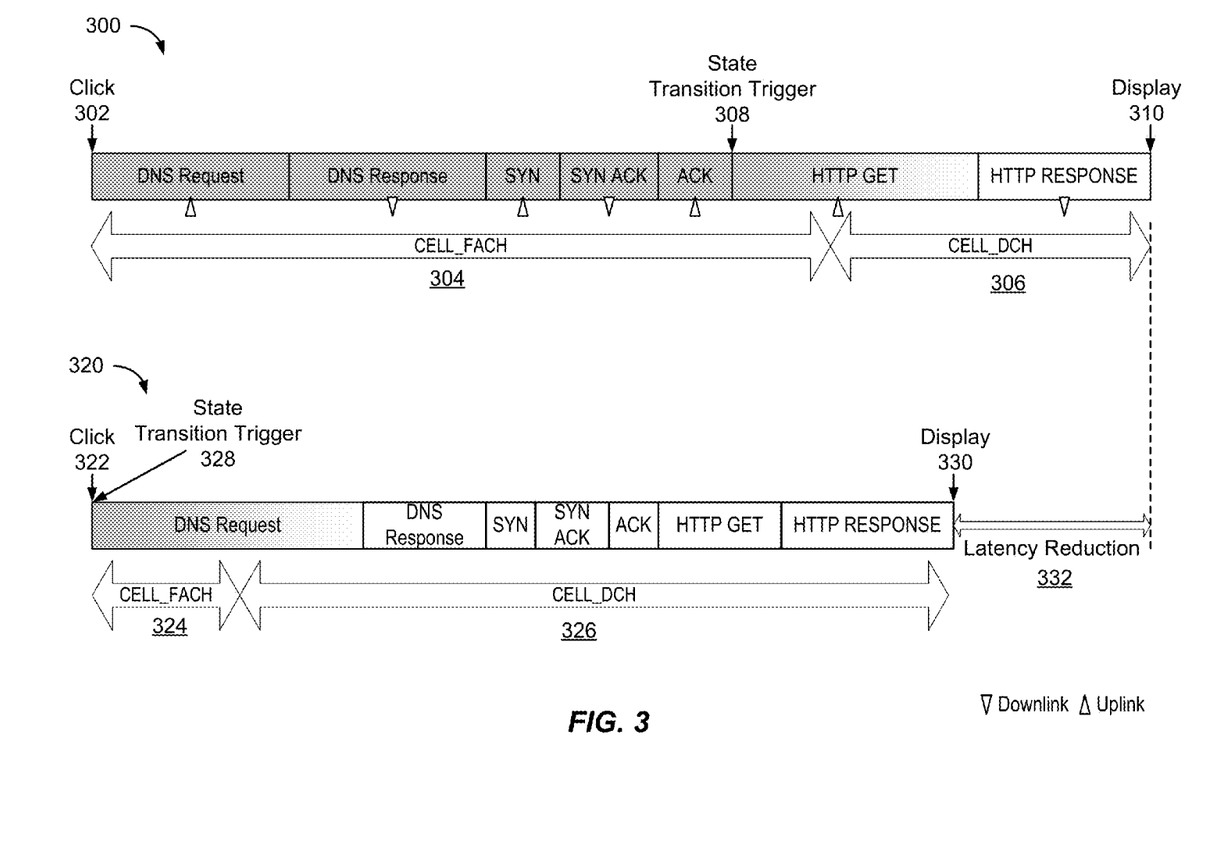
FIG. 3 is a conceptual diagram illustrating multiple data flows with reference to a CELL_FACH state in accordance with one or more of the presently described aspects.

Referring to FIG. 3, a conceptual diagram of multiple data flows is illustrated with reference to a transition from a CELL_FACH state 304, 324 to a CELL_DCH state 306, 326. In some aspects, data flows 300 and 320 may be in reference to latency reduction 332 for an application-specific activity related to web-browsing beginning from the CELL_FACH state 304, 324. For example, data flow 300 may trigger a change or transition from the CELL_FACH state 304 to the CELL_DCH state 306 as a result of high traffic volume as determined based on the network-configured criteria being met. In contrast, data flow 320, in accordance with the present aspects, may trigger early transition (e.g., compared to data flow 300) to the CELL_DCH state 326 from the CELL_FACH state 324 upon detecting an application-specific activity such as, but not limited to, web-browsing activity.

For example, with reference to data flow 300, which may be performed at UE 12 (FIG. 1), upon initiation or detection of an application-specific activity such as a click 302 within a web browser, the UE 12 may perform a DNS request or query and receive a DNS response from the network during the CELL_FACH state 304. Additionally, to establish the TCP connection, the UE 12 may, during the CELL_FACH state 304, transmit a SYN requesting an establishment of a TCP connection (e.g., by synchronizing the sequence numbers), receiving a SYN ACK message from the network indicating that the TCP connection has been opened, and transmitting an ACK message indicating a valid reception of the SYN ACK. Further, UE 12 may then generate a hypertext transfer protocol (HTTP) get message to retrieve information from a given server using a given URI.

In some aspects, upon transmitting the ACK message indicating a valid reception of the SYN ACK, UE 12 may detect state transition trigger 308, which may be indicative of an amount of data in UE's 12 buffer meeting or exceeding the network-configured threshold (e.g., Event 4A threshold), at which point the UE 12 transmits the Event 4A message. The network transitions the device (e.g., via a state transition message) to the CELL_DCH state 306 and the UE 12 may complete the HTTP Get transmission and receives an HTTP response. At this point, the UE 12 may display 310 content on the web-browser of UE 12. As such, in some aspects, the duration from click 302 to display 310 may contribute to user-perceived latency of web-browsing (e.g., time to content).

To reduce latency, UE 12 may trigger a fast transition from one connected state to another connect state in accordance with data flow 320. For instance, upon detecting a web-browsing session based on detecting a click 322 (e.g., or another application-specific activity) when in the CELL_FACH state 324, the UE 12 may, via state transition trigger 328, trigger early transition to the CELL_DCH 326 from the CELL_FACH state 324. Specifically, based on state transition trigger 328, the UE 12 may set the traffic volume indicator information element (IE) to TRUE in a cell update message during the CELL_FACH state 324, even though the amount of data in the buffer of UE 12 has not yet exceeded the network-configured threshold.

That is, the UE 12 may generate and transmit the cell update message with the IE set to TRUE indicating a request to transition to the CELL_DCH state 228 irrespective of whether the network-configured criteria for generating and transmitting such message have been met. Upon reception of the cell update message with the IE set to TRUE, the network indicates the UE 12 to transition to the CELL_DCH state 326 in a cell update confirm message. The UE 12 then may proceed with the DNS request and DNS response, SYN, SYN ACK, ACK, and HTTP request and HTTP response in the CELL_DCH state 326, resulting in display 330 of the content. As a result of the early transition to the CELL_DCH state 326 in data flow 320, the UE 12 may experience a latency reduction 332 compared to data flow 300 (e.g., faster click 322 to display 330).

Figure 4:
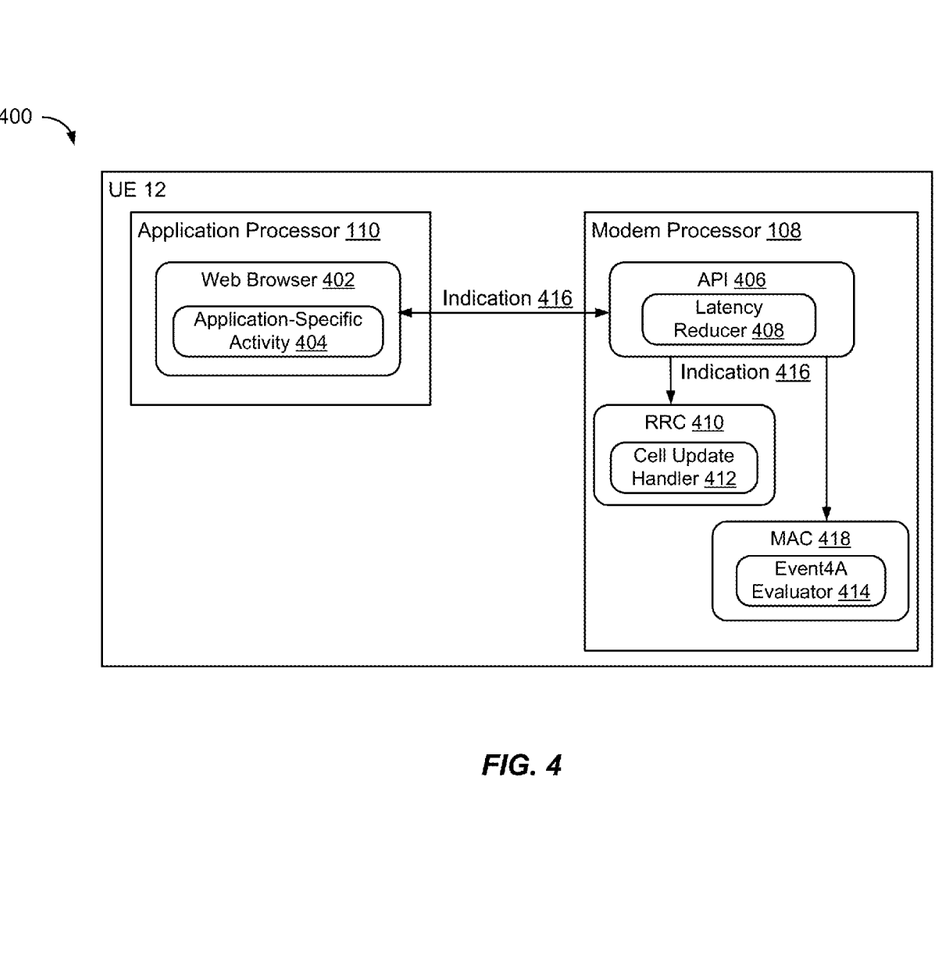
FIG. 4 is a schematic diagram of an application processor and modem processor of the user equipment in accordance with one or more of the presently described aspects.

Referring to FIG. 4 is a schematic diagram 400 of a communication interface between an application processor 110 and modem processor 108 of the UE 12. Specifically, in order to efficiently transition the communication state of UE 12 to a lower latency state, one or both of application processor 110 or modem processor 108 may be configured to detect the application-specific activity 404 at web browser 402. Upon such detection, modem processor 108 may transmit the cell update message to the network irrespective of whether a network-configured criteria has been met for such a transmission. That is, the UE 12 may independently determine when to transition to a different state regardless of any network-configured parameters for such transition.

For example, modem processor 108 of UE 12 may be responsible for setting the traffic volume indicator IE in the cell update message. Modem processor 108 may also be responsible for triggering and transmitting the Event 4A message. However, in some aspects, modem processor 108 may be unaware of application level information such as the start of an application-specific activity 404 (e.g., web-browsing session) at a web browser 402 of UE 12. Thus, it would be beneficial for the modem processor 108 to determine such information and/or be provided with such information by the application processor 110, for example.

In some aspects, the application-specific activity 404 may be detected by the application processor 110, which in turn may provide an indication 416 to the modem processor 108. Further, in some aspects, modem processor 108 may, via latency reducer 408, perform deep packet inspection (DPI) on one or more data packets associated with the application-specific activity 404 to detect a web-browsing session. For example, the presence of certain traffic types, such as DNS or traffic destined to a certain port, such as, but not limited to, port 80 may indicate the application-specific activity 404. Accordingly, latency reducer 408 may provide the indication 416 to one or both of the RRC layer 410 for cell update message transmission via cell update handler 412 or the MAC layer 418 for Event 4A message transmission by the Event4A evaluator 414. Further, in some aspects, application-specific activity may include any application of interest such as, but not limited to, messaging, audio and video playback, as well as web-browsing activity.

Figure 5:
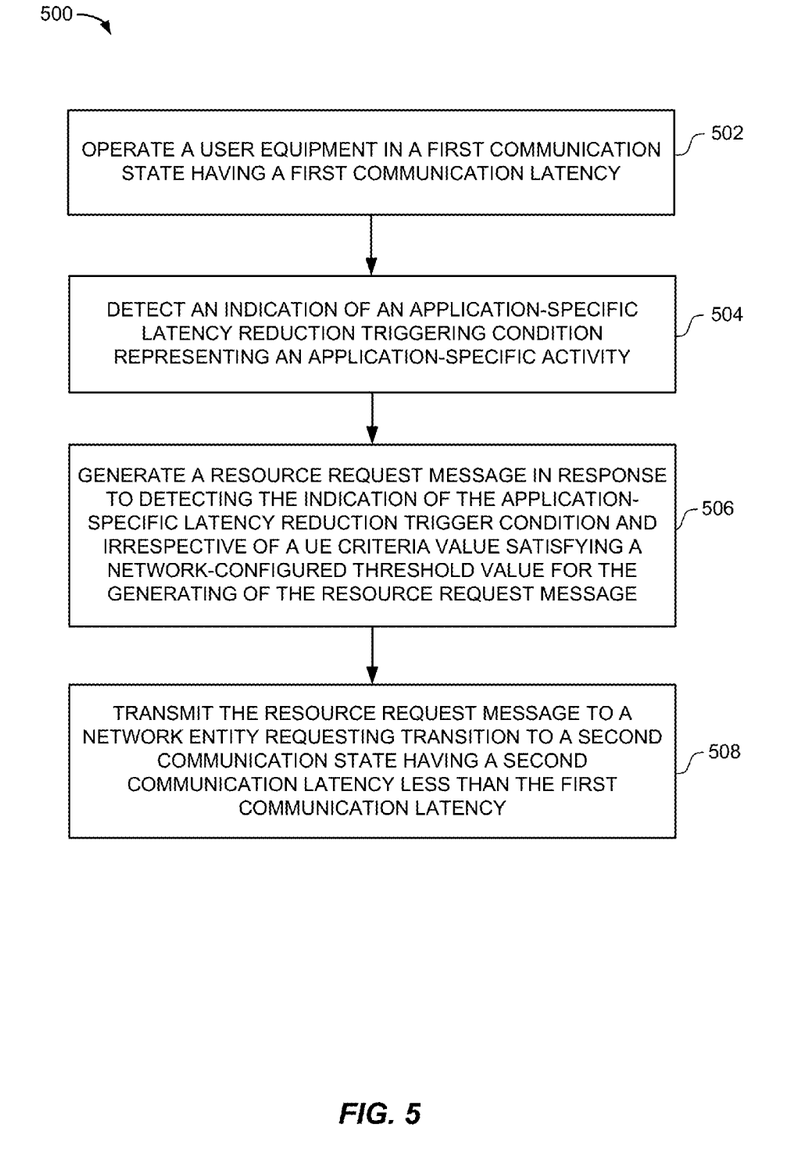
FIG. 5 is a flow diagram illustrating an example method of latency reduction in wireless communications according to one or more of the presently described aspects.

Referring to FIG. 5, in an operational aspect, a UE such as UE 12 (FIG. 1) may perform one aspect of a method 500 for reducing latency in a communications system. While, for purposes of simplicity of explanation, the method is shown and described as a series of acts, it is to be understood and appreciated that the method (and further methods related thereto) is/are not limited by the order of acts, as some acts may, in accordance with one or more aspects, occur in different orders and/or concurrently with other acts from that shown and described herein. For example, it is to be appreciated that a method could alternatively be represented as a series of interrelated states or events, such as in a state diagram. Moreover, not all illustrated acts may be required to implement a method in accordance with one or more features described herein.

In an aspect, at block 502, the method 500 may operate a user equipment in a first communication state having a first communication latency. In an aspect, for example, the UE 12 (FIG. 1) may, via modem processor 108, operate in an initial communication state that has an associated latency in its communications with network entity 14, 20. For example, UE 12 may initially operate in a CELL_FACH or URA_PCH state. Each of these communication states may have a certain latency, e.g., limited communication rates, etc., associated with communications between UE 12 and network entities 14, 20.

In an aspect, at block 504, the method 500 may detect an indication of an application-specific latency reduction trigger condition representing an application-specific activity. In an aspect, for example, the latency reduction component 181 (FIG. 1) of modem processor 108 may receive an indication of an application-specific latency reduction trigger condition representing an application-specific activity from latency trigger condition component 111. In an aspect, the latency trigger condition component 111 may generate and send the indication of an application-specific latency reduction trigger condition upon identification or detection of an application-specific activity or user action that would benefit from lower latency in transfer of data. In some aspects, the application-specific activity may include at least one of a web-browsing activity, a messaging activity, or a media player activity.

For example, latency trigger condition component 111 may identify or detect the startup of a data-intensive application or web browsing session. In this aspect, for example, latency trigger condition component 111 may be a part of application processor 110. In such aspect, for instance, application processor 110 may detect the application-specific activity corresponding to the application-specific latency reduction trigger condition and send in response to detecting the application-specific activity, the indication of the application-specific latency reduction triggering condition to the modem processor 108. Accordingly, detecting the indication of the application-specific latency reduction triggering condition at block 504 may include receiving, at the modem processor 108, the indication of the application-specific latency reduction trigger condition from the application processor 110.

Alternatively, latency trigger condition component 111 may perform DPI of one or more packets originating from application processor 110 to identify conditions that would require lower latency (e.g., web browsing). In this aspect, for example, latency trigger condition component 111 may be a part of modem processor 108. Specifically, for instance, modem processor 108 may detect the indication of the application-specific latency reduction triggering condition by initially receiving one or more data packets associated with an application from the application processor. Further, modem processor 108 may perform DPI of the one or more packets received from the application processor to detect the application-specific activity, and detect, in response to performing the DPI of the one or more packets, the application-specific activity corresponding to the application-specific latency reduction triggering condition based on a traffic type. In some aspects, the traffic type includes at least one of a DNS indication or a destination port indication.

In an aspect, at block 506, the method 500 may generate a resource request message in response to detecting the indication of the application-specific latency reduction triggering condition and irrespective of a UE criteria value satisfying a network-configured threshold value for the generating of the resource request message. That is, in some aspects, the resource request message may be generated even when the UE criteria value is less than a network-configured threshold value for generating of the resource request message. In some aspects, the UE criteria value may correspond to an amount of data in a buffer of the modem processor 108 and the network-configured threshold value may correspond to a threshold amount of data triggering generation of the resource request message when the UE criteria value (e.g., buffer size) satisfies (e.g., meets or exceeds) the network-configured threshold value. As such, in some aspects, the resource request message may be generated in response to detecting the indication of the application-specific latency reduction triggering condition and when the UE criteria value is or remains less than or below the network-configured threshold value.

In an aspect, for example, UE 12 may, via the latency reduction component 181 (FIG. 1), upon receipt of the indication of the application-specific latency reduction trigger condition, generate a resource request message. In some aspects, the latency reduction component 181 may operate or initiate the execution of cell update handler 183 to generate as a resource request a cell update request message that includes a traffic volume indicator IE that is set to TRUE. In some aspects, latency reduction component 181 may operate or initiate the execution of measurement report evaluation component 185 to generate as a resource request a traffic volume measurement report Event 4A.

In an aspect, at block 508, the method 500 may include transmitting the resource request message requesting a transition of the modem processor to a second communication state having a second communication latency that is less than the first communication latency. In an aspect, for example, modem processor 108 may, via latency reduction component 181 (FIG. 1), transmit the resource request message via transceiver 106 and RF front end 104 and antenna 102. For example, UE 12 may send the resource request message to one of network entity 14, 20 to request a transition of the modem processor from the current communication state (e.g., CELL_FACH) to a new communication state associated with a lower latency (e.g., CELL_DCH). In some aspects, the first communication state may correspond to one of a CELL_FACH state or a URA_PCH state and the second communication state may correspond to a CELL_DCH state.

Although not shown, in some aspects, method 500 may receive a state transition message from the network entity. For example, UE 12 (FIG. 1) may, via one or more of antenna 102, RF front end 104, or transceiver 106, a state transition message from the network entity in response to transmitting the resource request message. In some aspects, the state transition message may permit the UE 12 to transition from the first communication state to the second communication state. Further, method 500 may transition to the second communication state. For instance, UE 12 (FIG. 1) may, via latency reduction component 181, transition from the first communication state to the second communication state in response to receiving the state transition message.

Several aspects of a telecommunications system have been presented with reference to a W-CDMA system. As those skilled in the art will readily appreciate, various aspects described throughout this disclosure may be extended to other telecommunication systems, network architectures and communication standards.

By way of example, various aspects may be extended to other UMTS systems such as High Speed Downlink Packet Access (HSDPA), High Speed Uplink Packet Access (HSUPA), High Speed Packet Access Plus (HSPA+) and TD-CDMA. Various aspects may also be extended to systems employing Long Term Evolution (LTE) (in FDD, TDD, or both modes), LTE-Advanced (LTE-A) (in FDD, TDD, or both modes), CDMA2000, Evolution-Data Optimized (EV-DO), Ultra Mobile Broadband (UMB), IEEE 802.11 (Wi-Fi), IEEE 802.16 (WiMAX), IEEE 802.20, Ultra-Wideband (UWB), Bluetooth, and/or other suitable systems. The actual telecommunication standard, network architecture, and/or communication standard employed will depend on the specific application and the overall design constraints imposed on the system.

In accordance with various aspects of the disclosure, an element, or any portion of an element, or any combination of elements may be implemented with a "processing system" that includes one or more processors. Examples of processors include microprocessors, microcontrollers, digital signal processors (DSPs), field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise. The software may reside on a computer-readable medium. The computer-readable medium may be a non-transitory computer-readable medium. A non-transitory computer-readable medium includes, by way of example, a magnetic storage device (e.g., hard disk, floppy disk, magnetic strip), an optical disk (e.g., compact disk (CD), digital versatile disk (DVD)), a smart card, a flash memory device (e.g., card, stick, key drive), random access memory (RAM), read only memory (ROM), programmable ROM (PROM), erasable PROM (EPROM), electrically erasable PROM (EEPROM), a register, a removable disk, and any other suitable medium for storing software and/or instructions that may be accessed and read by a computer. The computer-readable medium may be resident in the processing system, external to the processing system, or distributed across multiple entities including the processing system. The computer-readable medium may be embodied in a computer-program product. By way of example, a computer-program product may include a computer-readable medium in packaging materials. Those skilled in the art will recognize how best to implement the described functionality presented throughout this disclosure depending on the particular application and the overall design constraints imposed on the overall system.

It is to be understood that the specific order or hierarchy of steps in the methods disclosed is an illustration of exemplary processes. Based upon design preferences, it is understood that the specific order or hierarchy of steps in the methods may be rearranged. The accompanying method claims present elements of the various steps in a sample order, and are not meant to be limited to the specific order or hierarchy presented unless specifically recited therein.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language of the claims, wherein reference to an element in the singular is not intended to mean "one and only one" unless specifically so stated, but rather "one or more." Unless specifically stated otherwise, the term "some" refers to one or more. A phrase referring to "at least one of" a list of items refers to any combination of those items, including single members. As an example, "at least one of: a, b, or c" is intended to cover: a; b; c; a and b; a and c; b and c; and a, b and c. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112, sixth paragraph, unless the element is expressly recited using the phrase "means for" or, in the case of a method claim, the element is recited using the phrase "step for."

What is claimed is:

1. A method of latency reduction in wireless communications, comprising:
   operating a user equipment (UE) in a first communication state having a first communication latency;

detecting, by a modem processor of the UE, an indication of an application-specific latency reduction triggering condition representing an application-specific activity based on a traffic type;

generating, by the modem processor of the UE, a resource request message in response to detecting the indication of the application-specific latency reduction triggering condition and irrespective of a UE criteria value satisfying a network-configured threshold value for the generating of the resource request message;

transmitting, by a transceiver of the UE, the resource request message to a network entity requesting transition of the modem processor to a second communication state having a second communication latency less than the first communication latency;

receiving, by the transceiver of the UE, a state transition message from the network entity in response to transmitting the resource request message;

selecting a physical channel from a set of physical channels for communication during the second communication state having the second communication latency less than the first communication latency; and transitioning to the second communication state for communication on the selected physical channel in response to receiving the state transition message.

2. The method of claim 1, further comprising:

detecting, at an application processor of the UE, the application-specific activity corresponding to the application-specific latency reduction trigger condition; and sending, by the application processor in response to detecting the application-specific activity, the indication of the application-specific latency reduction triggering condition.

3. The method of claim 2, wherein detecting the indication of the application-specific latency reduction triggering condition includes receiving, at the modem processor, the indication of the application-specific latency reduction trigger condition from the application processor.

4. The method of claim 1, wherein detecting the indication of the application-specific latency reduction triggering condition includes:

receiving, at the modem processor, one or more data packets associated with an application from an application processor;

performing, at the modem processor, deep packet inspection of the one or more packets received from the application processor to detect the application-specific activity; and detecting, at the modem processor, in response to performing the deep packet inspection of the one or more packets, the application-specific activity corresponding to the application-specific latency reduction triggering condition.

5. The method of claim 1, wherein the traffic type includes at least one of a domain name system (DNS) indication or a destination port indication.

6. The method of claim 1, wherein the UE criteria value corresponds to an amount of data in a buffer of the modem processor and the network-configured threshold value corresponds to a threshold amount of data triggering generation of the resource request message when the UE criteria value satisfies the network-configured threshold value.

7. The method of claim 6, wherein the resource request message is generated when the UE criteria value is less than the network-configured threshold value.

8. The method of claim 1, wherein the application-specific activity includes at least one of a web-browsing activity, a messaging activity, or a media player activity.

9. The method of claim 1, wherein the resource request message includes a traffic volume measurement report Event 4A.

10. The method of claim 1, wherein the resource request message includes a cell update message, wherein the cell update message includes a traffic volume indicator information element that is set to true.

11. The method of claim 1, wherein the first communication state corresponds to one of a CELL_FACH state or a URA_PCH state and the second communication state corresponds to a CELL_DCH state.

12. An apparatus for latency reduction in wireless communications, comprising:

an application processor configured to operate the UE in a first communication state having a first communication latency;

a modem processor coupled to the application processor and configured to:

detect an indication of an application-specific latency reduction triggering condition representing an application-specific activity based on a traffic type; and generate a resource request message in response to detecting the indication of the application-specific latency reduction triggering condition and irrespective of a UE criteria value satisfying a network-configured threshold value for the generating of the resource request message;

transmit, via a transceiver coupled to the modem processor, the resource request message to a network entity requesting transition of the modem processor to a second communication state having a second communication latency less than the first communication latency;

receive, by the transceiver of the UE, a state transition message from the network entity in response to transmitting the resource request message;

select a physical channel from a set of physical channels for communication during the second communication state having the second communication latency less than the first communication latency; and transition to the second communication state for communication on the selected physical channel in response to receiving the state transition message.

13. The apparatus of claim 12, wherein the application processor is further configured to:

detect the application-specific activity corresponding to the application-specific latency reduction trigger condition; and send, in response to detecting the application-specific activity, the indication of the application-specific latency reduction triggering condition.

14. The apparatus of claim 13, wherein to detect the indication of the application-specific latency reduction triggering condition, the modem processor is further configured to receive the indication of the application-specific latency reduction trigger condition from the application processor.

15. The apparatus of claim 12, wherein to detect the indication of the application-specific latency reduction triggering condition, the modem processor is further configured to:

receive one or more data packets associated with an application from the application processor;

perform deep packet inspection of the one or more packets received from the application processor to detect the application-specific activity; and detect, in response to performing the deep packet inspection of the one or more packets, the application-specific activity corresponding to the application-specific latency reduction triggering condition.

16. The apparatus of claim 12, wherein the traffic type includes at least one of a domain name system (DNS) indication or a destination port indication.

17. The apparatus of claim 12, wherein the UE criteria value corresponds to an amount of data in a buffer of the modem processor and the network-configured threshold value corresponds to a threshold amount of data triggering generation of the resource request message when the UE criteria value satisfies the network-configured threshold value.

18. The apparatus of claim 17, wherein the resource request message is generated when the UE criteria value is less than the network-configured threshold value.

19. The apparatus of claim 12, wherein the application-specific activity includes at least one of a web-browsing activity, a messaging activity, or a media player activity.

20. The apparatus of claim 12, wherein the resource request message includes a traffic volume measurement report Event 4A.

21. The apparatus of claim 12, wherein the resource request message includes a cell update message, wherein the cell update message includes a traffic volume indicator information element that is set to true.

22. The apparatus of claim 12, wherein the first communication state corresponds to one of a CELL_FACH state or a URA_PCH state and the second communication state corresponds to a CELL_DCH state.

23. A non-transitory computer-readable medium storing computer executable code for latency reduction, comprising code for:
    operating a user equipment (UE) in a first communication state having a first communication latency;
    detecting, by a modem processor of the UE, an indication of an application-specific latency reduction triggering condition representing an application-specific activity based on a traffic type;
    generating, by the modem processor of the UE, a resource request message in response to detecting the indication of the application-specific latency reduction triggering condition and irrespective of a UE criteria value satisfying a network-configured threshold value for the generating of the resource request message;
    transmitting, by a transceiver of the UE, the resource request message to a network entity requesting transition of the modem processor to a second communication state having a second communication latency less than the first communication latency;
    receiving, by the transceiver of the UE, a state transition message from the network entity in response to transmitting the resource request message;
    selecting a physical channel from a set of physical channels for communication during the second communication state having the second communication latency less than the first communication latency; and
    transitioning to the second communication state for communication on the selected physical channel in response to receiving the state transition message.

24. The non-transitory computer-readable medium of claim 23, wherein the UE criteria value corresponds to an amount of data in a buffer of the modem processor and the network-configured threshold value corresponds to a threshold amount of data triggering generation of the resource request message when the UE criteria value satisfies the network-configured threshold value.

25. The non-transitory computer-readable medium of claim 24, wherein the resource request message is generated when the UE criteria value is less than the network-configured threshold value.

26. An apparatus for latency reduction in wireless communications, comprising:
    means for operating a modem processor of a user equipment (UE) in a first communication state having a first communication latency;
    means for detecting an indication of an application-specific latency reduction triggering condition representing an application-specific activity based on a traffic type;
    means for generating a resource request message in response to detecting the indication of the application-specific latency reduction triggering condition and irrespective of a UE criteria value satisfying a network-configured threshold value for the generating of the resource request message;
    means for transmitting the resource request message to a network entity requesting transition of the modem processor to a second communication state having a second communication latency less than the first communication latency;
    receiving, by the transceiver of the UE, a state transition message from the network entity in response to transmitting the resource request message;
    selecting a physical channel from a set of physical channels for communication during the second communication state having the second communication latency less than the first communication latency; and
    transitioning to the second communication state for communication on the selected physical channel in response to receiving the state transition message.

27. The apparatus of claim 26, wherein the UE criteria value corresponds to an amount of data in a buffer of the modem processor and the network-configured threshold value corresponds to a threshold amount of data triggering generation of the resource request message when the UE criteria value satisfies the network-configured threshold value.

28. The apparatus of claim 27, wherein the resource request message is generated when the UE criteria value is less than the network-configured threshold value.

29. The method of claim 1, further comprising monitoring the selected physical channel via a paging indicator channel (PICH).

30. The apparatus of claim 12, wherein the modem processor is further configured to monitor the selected physical channel via a paging indicator channel (PICH).

* * * * *